United States Patent Office 3,134,665
Patented May 26, 1964

3,134,665
METHOD FOR DESTROYING WEEDS
Henry Martin, Basel, and Hans Aebi, Riehen, Switzerland, assignors to Ciba Limited, Basel, Switzerland, a company of Switzerland
No Drawing. Filed Aug. 5, 1960, Ser. No. 47,624
Claims priority, application Switzerland Aug. 21, 1959
11 Claims. (Cl. 71—2.6)

N-trifluoromethyl-phenyl - N':N' - dimethyl-ureas have been described in the literature (see Chemical Abstracts, vol. 50 (1956), 15, 756g). J. S. C. Wessels and R. Van der Veen have also determined the inhibiting value of these substances of the photolysis of water that is vital in the carbon metabolism of plants (see Biochim. et Biophys. Acta, 1956, vol. 19, pages 548 to 549). It is probable that, owing to their relatively low inhibiting value, these N-trifluoromethyl-phenyl-ureas have found no practical importance as herbicides. Among the numerous N-aryl-N':N'-dialkyl-ureas developed for herbicidal purposes no active substance containing trifluoromethyl has been described. No method for preparing these trifluoromethyl-phenyl - N':N' - dimethyl-ureas has been described. No melting points have been given nor any analysis. Furthermore, no information is given with regard to the purity of the products used in Hill's reaction.

The present invention is based on the unexpected observation that N - mono - (trifluoromethyl) - phenyl - N':N'-dimethyl-ureas possess a strong herbicidal action. This is all the more unexpected in view of the fact that N-3:5-bis-trifluoromethyl-phenyl - N':N'-dimethyl-urea possesses no herbicidal action.

Accordingly, the present invention provides herbicidal preparations which comprise an N-trifluoromethyl-phenyl-N':N'-dimethyl-urea in admixture with a pulverulent carrier and/or a dispersing agent and/or a high boiling organic solvent.

N-3-trifluoromethyl-phenyl-N':N'-dimethyl-urea can be made by methods in themselves known. After recrystallization from alcohol it melts at 159 to 160.5° C. It has the following nitrogen content:

| | Percent |
|---|---|
| Calculated | 12.06 |
| Found | 12.02 |

The herbicidal preparations of this invention are suitable for influencing plant growth and/or for controlling the development or destroying germinating plants or fully grown plants.

The herbicidal preparations may take the form of dusting preparations or solutions, emulsions or dispersions and may contain the aforesaid urea compounds alone or together with another weed killer, for example, a tri- or tetra-substituted aryl-alkyl-urea, a halogenated phenoxy-alkane-carboxylic acid, a halogenated benzoic acid or phenylacetic acid, a halogenated fatty acid or a salt, ester or amide thereof, or with borax or other inorganic salt, such as abraum salts, or with calcium cyanamide, urea or other fertilizer, or with a pest combating agent, for example, a chlorinated hydrocarbon or a phosphoric acid ester. Basic active substances, for example, tertiary or quaternary amines having a herbicidal action, may also be added such, for example, as dodecyl-hexamethylene-imine or salts thereof, or 1:1'-ethylene-2:2'-dipyridinium dibromide. There may also be incorporated with the preparations herbicidal carbamates or thiol-carbamates or dithio-carbamic acid esters or derivatives of symmetrical triazine. Herbicidal heterocyclic compounds may also be added, for example, 2-chlorobenzthiazole, 3-amino-1:2:4-triazole, maleic acid hydrazide, 3:5-dimethyl-tetrahydro-1:3:5:2:4-thiadiazine-2-thione, or more simple herbicides, such as pentachlorophenol, dinitrocresol, dinitro-butyl-phenol, naphthyl-phthalamic acid or methyl isothiocyanate.

In order to prepare a solution suitable for direct spraying there may be used, for example, a mineral oil fraction of high or medium boiling range, such as diesel oil or kerosene, or coal tar oils, or vegetable or animal oils and also hydrocarbons such as alkylated naphthalenes, or tetrahydronaphthalene, if desired, with the use of xylene mixtures, cyclohexanols, ketones, or chlorinated hydrocarbons, such as tetrachlorethane, trichlorethylene or tri- or tetrachlorobenzenes.

Aqueous preparations suitable for application can be prepared by the addition of water to emulsion concentrates, pastes or wettable powders. As emulsifying or dispersing agents there may be used non-ionic products, for example, condensation products of ethyleneoxide with aliphatic alcohols, amines or carboxylic acids containing a hydrocarbon radical having about 10 to 30 carbon atoms, such as a condensation product of octadecyl alcohol with 25 to 30 molecular proportions of ethylene oxide, or of soya bean fatty acid with 30 molecular proportions of ethylene oxide or of commercial oleylamine with 15 molecular proportions of ethylene oxide or of dodecylmercaptan with 12 molecular proportions of ethyleneoxide. Among anion active emulsifying agents there may be mentioned the sodium salt of dodecyl alcohol sulfuric acid ester, the sodium salt of dodecyl-benzene sulfonic acid, the potassium or triethanolamine salt of oleic acid or abietic acid or of a mixture of these acids, or the sodium salt of petroleum-sulfonic acid. As cation-active dispersing agents there may be used quaternary ammonium compounds, such as cetyl-pyridinium bromide or di-(hydroxyethyl)-benzyl-dodecyl-ammonium chloride.

For making dusting or scattering preparations there may be used as solid carriers talcum, kaolin, bentonite, calcium carbonate or calcium phosphate or carbon, cork meal or wood meal or other materials of vegetable origin. The various preparations can be rendered more suitable for the various ways in which they are to be used by the known addition of substances which improve the dispersion, adhesiveness, resistance to rain or penetration capacity of the compositions. As such substances there may be mentioned fatty acids, resins, glue, casein or, for example, alginates or the like. It is of considerable advantage to make up the preparations in granular form.

The herbicidal preparations of this invention are suitable, depending on the concentration in which they are used, for the selective destruction of weeds under crop plants and also for the total killing and destruction of undesired plant growth. The term "weeds" is used in this connection to include undesired plants, that is to say, plants previously planted or growing in the vicinity.

The following examples illustrate the invention, the parts and percentages being by weight:

*Example 1*

20 parts of N-3-trifluoromethyl-phenyl-N':N'-dimethyl-urea and 80 parts of talcum are very finely ground in a ball mill. The mixture so obtained is useful as a dusting preparation.

*Example 2*

20 parts of N-3-trifluoromethyl-phenyl-N':N'-dimethyl-urea are dissolved in a mixture of 48 parts of diacetone alcohol, 16.5 parts of xylene and 16 parts of a condensation product of ethylene oxide with a higher fatty acid, for example, the condensation product of soya bean fatty acid with 30 mols of ethyleneoxide. The resulting concentrate can be diluted with water to form an emulsion of any desired concentration.

*Example 3*

80 parts of N-4-trifluoromethyl-phenyl-N':N'-dimethylurea are mixed with four parts of a wetting agent, for example, the sodium salt of butyl-naphthalene sulfonic acid, 1 to 3 parts of a protective colloid, for example, sulfite cellulose waste liquor, and 15 parts of a solid inert carrier, such as kaolin, chalk or kieselguhr, and the mixture is then finely ground. The wettable powder so obtained can be stirred with water before use to yield a suspension ready for use.

Example 4

15 parts of N-3-trifluoromethyl-phenyl-N':N'-dimethyl-urea are dissolved in 90 parts of coal tar oil, diesel oil or spindle oil.

Example 5

N-3-trifluoromethyl-phenyl-N':N'-dimethyl-urea was applied at the rate of 10 to 20 kilograms in 1000 liters per hectare to a courtyard infested with weeds and destroyed all the weeds within a few weeks.

Example 6

10 grams of N-3-trifluoromethyl-phenyl-N':N'-dimethyl-urea and 2 grams of sulfite cellulose waste liquor are mixed with 100 cc. of water, and the mixture is subjected to intense grinding. A stable dispersion of fine particle size is obtained.

Example 7

80 parts of N-3-trifluoromethyl-phenyl-N':N'-dimethyl-urea, 10 parts of sulfite cellulose waste liquor, 8 parts of talcum and 2 parts of the condensation product of para-octyl-phenol with 18 mols of ethyleneoxide are mixed together and then finely ground. The resulting preparation is suitable as a powder form making up spray liquors, and can be diluted as desired with water.

Example 8

Seeds of *Avena sativa, Zea mays, Sorghum sudanense, Dactylis glomerata, Sinapis alba, Pisum sativum, Anthriscus cerofolium* and *Calendula chrysantha*, were sown in flower pots filled with soil in a greenhouse and watered. The surface of the soil was then spread with a dispersion of the preparation described in Example 6 at the rate of 2 kilograms of active substance per hectare. 25 days after the application the test plants, except *Zea mays* which was only slightly damaged, were completely destroyed or so seriously damaged that they were unable to recover.

Example 9

Flower pots were sown with seeds in the same manner as that described in Example 8. A dispersion as prepared in Example 6 was applied at the rate of two kilograms of active substance per hectare, when the dicotyledonous plants had passed the rosette state. Three weeks after the treatment all the plants had been destroyed, with the exception of *Avena sativa* and *Zea mays* which were destroyed only after a long period.

Example 10

A field was freed from all annual weeds, and then sown with the following weeds and crop plants: *Raphanus raphanistrum, Sinapis alba, Triticum vulgare, Avena sativa, Zea mays, Beta vulgaris, Pisum sativum, Setaria italicum, Soja max, Linum usitatissimum, Cannabis sativa, Spinacia oleracea, Sorghum sudanense, Phaseolus vulgaris, Brassica rapa, Trifolium repens, Trifolium pratense, Allium cepa, Lactuca sativa* and *Daucus carota*. The field was then sprayed with a dispersion of the preparation described in Example 7 at the rate of 2.5 kilograms of active substance per hectare. 30 days after the treatment all the test plants had been destroyed, with the exception of *Zea mays* which had only been damaged. At the time of inspection the weeds present in the test field, such as *Lamium purpureum, Chenopodium album, Capsella bursa pastoris, Galeopsis tetrahit, Senecio vulgaris, Polygonum aviculare, Polygonum convolvulus* and *Ranunculus repens,* had also been destroyed.

Example 11

A field was prepared and sown in the manner described in Example 10 and when *Phaseolus vulgaris* as indicator plants had developed the first trifoliate leaf they were then sprayed with a dispersion of the preparation described in Example 7 at the rate of 2.5 kilograms of active substance per hectare. 30 days after the treatment all the test plants had been completely destroyed as well as the weeds mentioned in Example 10.

What is claimed is:

1. A method for destroying weeds which comprises applying to the area where the weed-destroying effect is desired, a herbicidal amount of a member selected from the group consisting of N-3-trifluoromethyl-phenyl-N',N'-dimethyl urea and N-4-trifluoromethyl-phenyl-N',N'-dimethyl urea.

2. A method for destroying weeds which comprises applying to the area where the weeds are growing a herbicidal amount of a composition of matter consisting of N-3-trifluoromethyl-phenyl-N',N'-dimethyl urea as herbicide and a compatible carrier selected from the group consisting of pulverulent carriers, dispersing agents and organic solvents boiling above 100° C.

3. A method for destroying weeds which comprises applying to the area where the weeds are growing a herbicidal amount of a composition of matter consisting of N-4-trifluoromethyl-phenyl-N',N'-dimethyl urea as herbicide and a compatible carrier selected from the group consisting of pulverulent carriers, dispersing agents and organic solvents boiling above 100° C.

4. A method for destroying weeds which comprises applying to the area before the weeds are growing a herbicidal amount of a composition of matter consisting of N-3-trifluoromethyl-phenyl-N',N'-dimethyl urea as herbicide and a compatible carrier selected from the group consisting of pulverulent carriers, dispersing agents and ogranic solvents boiling above 100° C.

5. A method for destroying weeds which comprises applying to the area before the weeds are growing a herbicidal amount of a composition of matter consisting of N-4-trifluoromethyl-phenyl-N',N'-dimethyl urea as herbicide and a compatible carrier selected from the group consisting of pulverulent carriers, dispersing agents and organic solvents boiling above 100° C.

6. A method for destroying weeds which comprises applying to the area where the weed-destroying effect is desired, a herbicidal amount of a composition of matter consisting of N-3-trifluoromethyl-phenyl-N',N'-dimethyl urea as herbicide and a compatible pulverulent carrier, the composition being in the form of a scattering preparation.

7. A method for destroying weeds which comprises applying to the area where the weed-destroying effect is desired, a herbicidal amount of a composition of matter consisting of N-4-trifluoromethyl-phenyl-N',N'-dimethyl urea as herbicide and a compatible pulverulent carrier, the composition being in the form of a scattering preparation.

8. A method for destroying weeds which comprises applying to the area where the weed-destroying effect is desired, a herbicidal amount of a composition of matter consisting of N-3-trifluoromethyl-phenyl-N',N'-dimethyl urea as herbicide, a compatible dispersing agent and water, the composition being in the form of an aqueous dispersion.

9. A method for destroying weeds which comprises applying to the area where the weed-destroying effect is desired, a herbicidal amount of a composition of matter consisting of N-4-trifluoromethyl-phenyl-N',N'-dimethyl urea as herbicide, a compatible dispersing agent and water, the composition being in the form of an aqueous dispersion.

10. A method for destroying weeds which comprises applying to the area where the weed-destroying effect is desired, a herbicidal amount of a composition of matter consisting of N-3-trifluoromethyl-phenyl-N',N'-dimethyl uurea as herbicide, and a compatible organic solvent boiling above 100° C.

11. A method for destroying weeds which comprises applying to the area where the weed-destroying effect is desired, a herbicidal amount of a composition of matter consisting of N-4-trifluoromethyl-phenyl-N',N'-dimethyl urea as herbicide and a compatible organic solvent boiling above 100° C.

References Cited in the file of this patent

UNITED STATES PATENTS 2,709,648   Ryker et al. _____ May 31, 1955

OTHER REFERENCES

Abel: "Chemistry and Industry," August 17, 1957, pages 1106–1112.

Wessels et al. in "Biochem. et Biophys. Acta," vol. 19, 1956, pages 548–549.